United States Patent
Van Krevelen et al.

(10) Patent No.: US 7,047,359 B1
(45) Date of Patent: *May 16, 2006

(54) METHOD, SYSTEM AND PRODUCT FOR MANAGING A VIRTUAL STORAGE SYSTEM

(75) Inventors: Christopher John Van Krevelen, Coon Rapids, MN (US); Reed S. Nelson, Shoreview, MN (US); James P. Hughes, Minneapolis, MN (US); Timothy J. Mueggenberg, Coon Rapids, MN (US); Atiq Ahamad, Maplegrove, MN (US); Ravi Kumar Kavuri, Inver Grove Heights, MN (US)

(73) Assignee: Storage Technology Corporation, Louisville, CO (US)

( * ) Notice: Subject to any disclaimer, the term of this patent is extended or adjusted under 35 U.S.C. 154(b) by 137 days.

This patent is subject to a terminal disclaimer.

(21) Appl. No.: 10/321,748

(22) Filed: Dec. 17, 2002

(51) Int. Cl.
*G06F 12/00* (2006.01)
(52) U.S. Cl. .................. 711/114; 711/170; 711/162; 714/6
(58) Field of Classification Search .............. 710/6; 711/114, 112, 162, 170; 714/6, 7
See application file for complete search history.

(56) References Cited

U.S. PATENT DOCUMENTS

| | | | |
|---|---|---|---|
| 6,330,625 B1 * | 12/2001 | Bridge | 710/39 |
| 6,594,745 B1 * | 7/2003 | Grover | 711/162 |
| 6,662,268 B1 * | 12/2003 | McBrearty et al. | 711/114 |
| 6,757,778 B1 * | 6/2004 | van Rietschote | 711/6 |
| 6,775,790 B1 * | 8/2004 | Reuter et al. | 714/5 |
| 6,804,690 B1 * | 10/2004 | Dysert et al. | 707/204 |
| 2002/0004883 A1 * | 1/2002 | Nguyen et al. | 711/111 |
| 2003/0188097 A1 * | 10/2003 | Holland et al. | 711/114 |

OTHER PUBLICATIONS

Tolia, et al., "Opportunistic Use of Content Addressable Storage for Distributed File Systems," IRP-TR-03-02, Jun. 2003, Intel Research, To Appear in the Proceedings of the 2003 USENIX Annual Technical Conference, San Antonio, TX, 16 pages.*

* cited by examiner

*Primary Examiner*—Pierre-Michel Bataille
(74) *Attorney, Agent, or Firm*—Yee & Associates, P.C.

(57) ABSTRACT

A data processing system, method, and product are disclosed for managing a virtual storage system. A first command is received from a host to store data utilizing a storage scheme. At least one second command is generated to write data according to the storage scheme to ones of the storage devices in response to the receipt of the first command. The at least one second command is then transmitted to the ones of the plurality of storage devices. Data is stored in the ones of the storage devices according to the storage scheme in response to a receipt of the second command by a storage device.

48 Claims, 13 Drawing Sheets

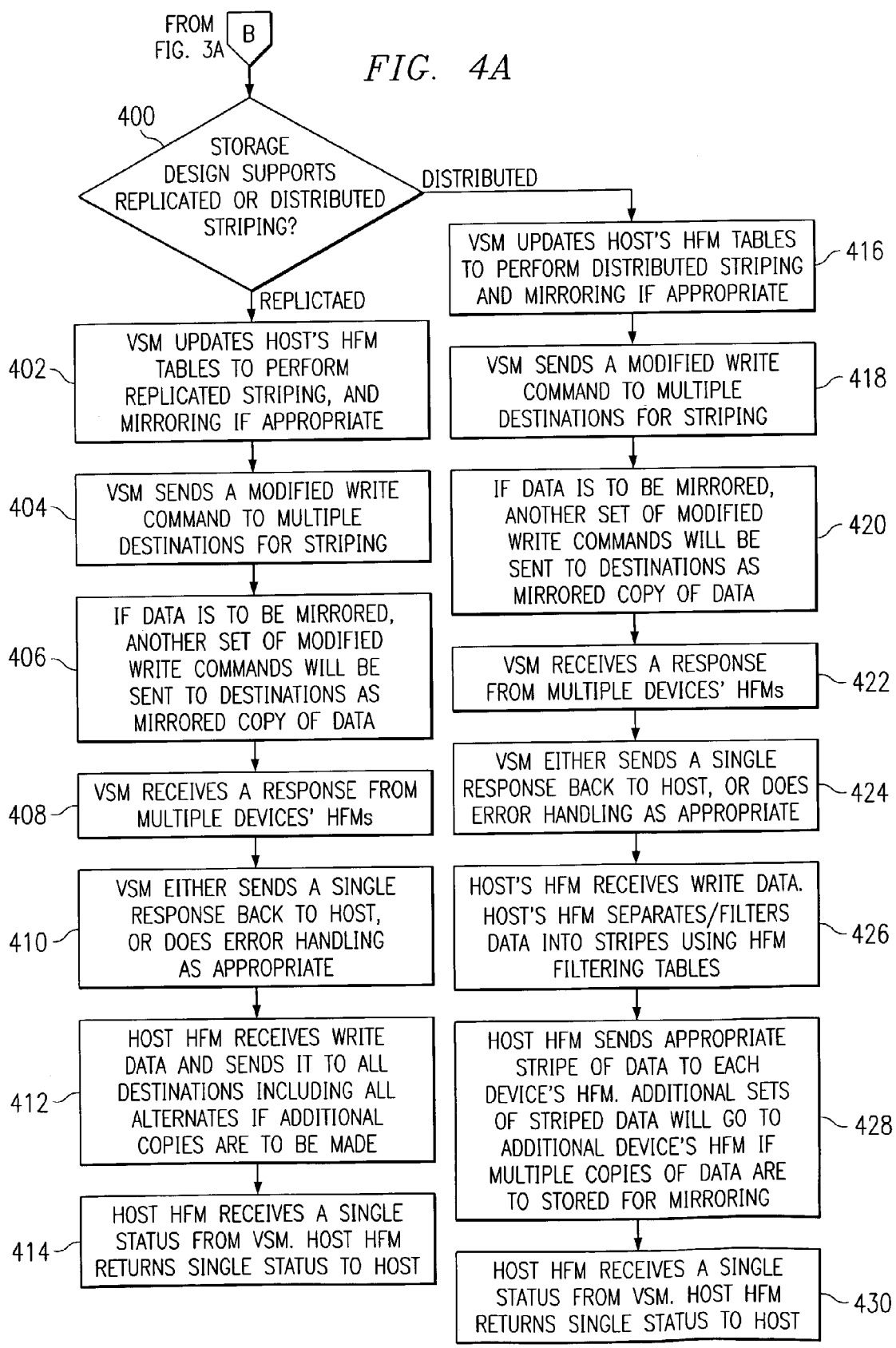

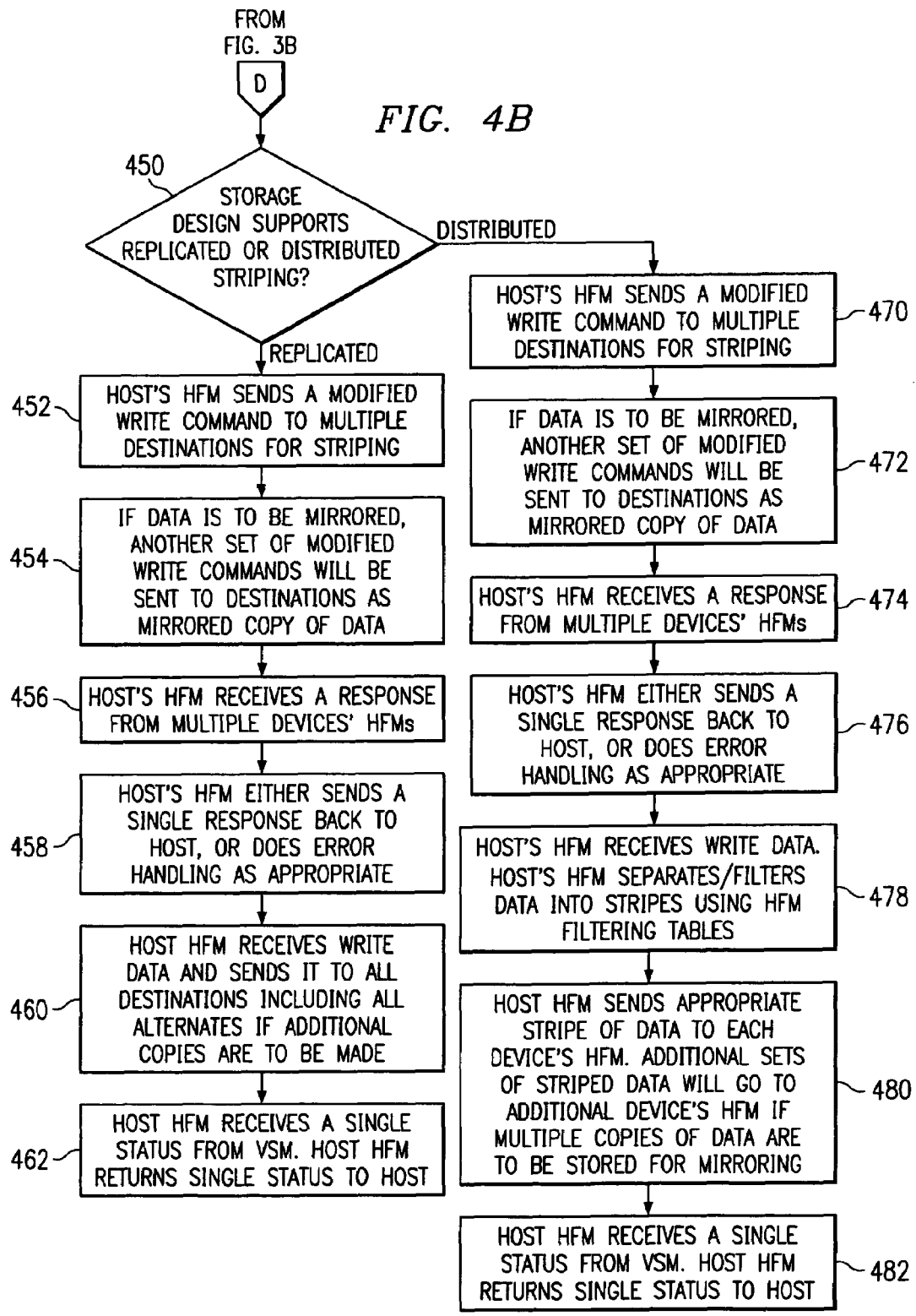

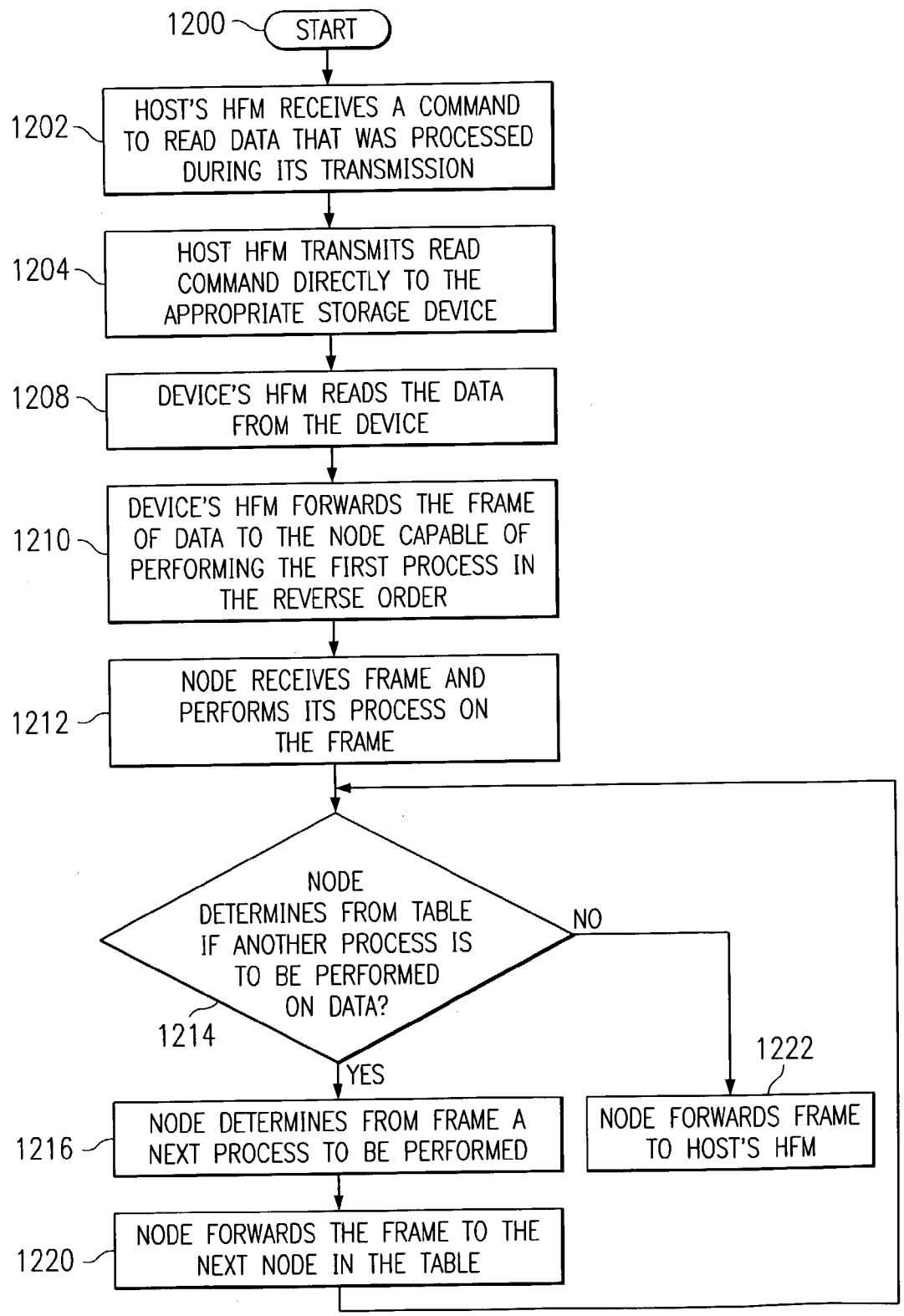

METHOD, SYSTEM AND PRODUCT FOR MANAGING A VIRTUAL STORAGE SYSTEM

BACKGROUND OF THE INVENTION

1. Field of the Invention

The present invention relates to data processing systems, and more particularly to a data processing system, method, and computer program product for managing a virtual storage system.

2. Background of the Invention

Conventional data storage systems include one or more storage devices. As used herein, the term "storage device" refers to any device, drive, or apparatus that is used for the storage of data, e.g., a tape drive or a disk drive.

A logical volume manager can be used to manage storage systems containing multiple storage devices. The logical volume manager configures a pool of tape drives into logical volumes so that applications and users interface with logical volumes instead of directly accessing physical tape drives. One advantage of using a logical volume manager is that a logical volume may span multiple physical drives, but is accessed transparently as if it were a single tape drive.

Existing storage and retrieval solutions currently transmit data from the host directly to the storage device. Thus, the host is responsible for preparing the data in a particular format for storage. For example, some systems use a data mirroring storage scheme such that mirrored copies of data are stored in order to improve the reliability of the system. When data is mirrored, the host must transmit multiple requests to store the data. The host duplicates the data and transmits a request to each device that will be used to store a copy of the data. When this data is retrieved, the host must perform the error handling in order to recover an accurate copy of the mirrored data.

Another storage scheme commonly used for storing data is data striping. The host is responsible for segmenting the data into stripes, and transmitting each stripe to the device that will be used to store the stripe. Each device then receives only its stripe of data. When this data is retrieved, the host is responsible for reading each stripe from each device, and then combining the stripes to reproduce the original data.

Executing these storage schemes requires a large amount of host processing time. This slows the overall performance of the storage system.

Therefore, a need exists for a method, system, and product for efficiently managing a storage system.

SUMMARY OF THE INVENTION

A data processing system, method, and product are disclosed for managing a virtual storage system that includes multiple storage devices. A first command is received from a host to store data utilizing a particular storage scheme. At least one second command is generated to write data according to the storage scheme to ones of the storage devices in response to the receipt of the first command. The at least one second command is then transmitted to the ones of the plurality of storage device. Data is stored in the ones of the storage device according to the storage scheme in response to a receipt of the second command by a storage device.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 4a depicts a high level flow chart which illustrates a virtual storage manager providing virtualization when a host writes striped data to a storage device utilizing a hardware frame modifier in accordance with the present invention;

FIG. 4b illustrates a high level flow chart which depicts a host writing striped data to a storage device utilizing a hardware frame modifier in accordance with the present invention;

FIG. 12 depicts a high level flow chart which illustrates a host reading data from a storage device where the data was processed when it was transmitted to be stored utilizing various nodes included in the network in accordance with the present invention.

DETAILED DESCRIPTION OF THE PREFERRED EMBODIMENT

Figure 1:
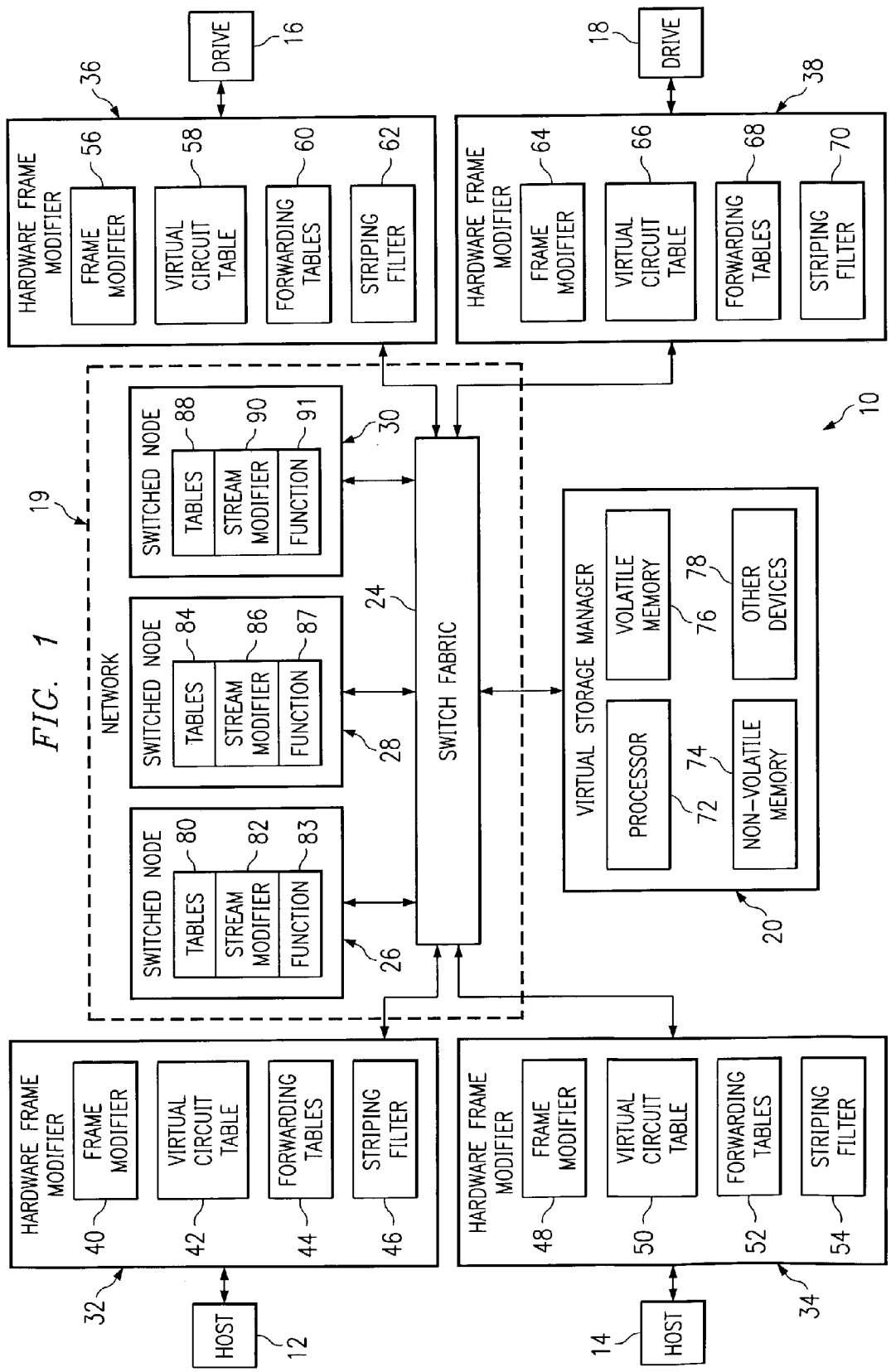
FIG. 1 is a block diagram of a data processing system in accordance with the present invention.

A preferred embodiment of the present invention and its advantages are better understood by referring to the figures, like numerals being used for like and corresponding parts of the accompanying figures.

The present invention is a system, method, and computer program product for managing a virtual storage system that includes a plurality of storage devices. A host transmits requests to read or write data according to a particular storage scheme. A storage scheme may be a data striping scheme, a data mirroring scheme, or another storage method.

The system includes a Virtual Storage Manager (VSM) and multiple hardware frame modifiers. Each host and storage device is preferably associated with a hardware frame modifier. The VSM is responsible for performing virtualization and coordinating responses from the storage devices. Each hardware frame modifier includes virtualization tables within which is stored the information that is necessary to forward a request having a virtual address to a request having the appropriate physical address. The first time a command is received for a particular virtual address, the VSM performs the virtualization to convert the virtual volume and device data to physical volume and device data. The VSM then stores this conversion information in the virtualization table of the hardware frame modifier that is associated with the host that transmitted the command. Thereafter, the hardware frame modifier may use the information in the virtualization table to perform the conversion without the need to involve either the host or the VSM.

When the storage scheme is a data mirroring scheme, the host transmits a request to either write mirrored data, or read data that was mirrored when it was stored. When a host transmits a request to write mirrored data, the request, including a copy of the data, is received within a hardware frame modifier that is associated with the host. The hardware frame modifier then determines an address of each storage device that will be used to store a copy of the mirrored data. Commands are then generated to write the mirrored data. Each command will include an address of a particular storage device and location for the data, and a duplicate copy of the data. The commands are then transmitted from the host's hardware frame modifier to the appropriate storage devices. Each storage device then executes the command it received and stores its copy of the data.

A host may transmit a request to read data that had been mirrored when it was stored. This request is transmitted to the hardware frame modifier associated with the host. Each storage device may also have an associated hardware frame modifier. The host's hardware frame modifier then sends the read command to the hardware frame modifier for each device that had stored a copy of the mirrored data. Each device's hardware frame modifier then forwards a copy of its data to the Virtual Storage Manager. The VSM is then responsible for executing error handling in order to produce a single copy of the correct mirrored data for the host.

Another storage scheme is data striping. A host may transmit data that is to be striped across storage devices. According to the present invention, the host transmits a copy of all of the data. According to the present invention, each storage device will receive a copy of all of the data that is to be striped. In the prior art, the host transmitted to a storage device only the stripe that the particular storage device was to store such that each device received only its stripe.

The host transmits a copy of all of the data to the host's hardware frame modifier. Each storage device's hardware frame modifier includes a striping filter. The striping filter is used to select a particular stripe of data that is to be stored in the storage device. For example, a host may transmit a request to the host's hardware frame modifier to write striped data, where the request includes all of the data to be striped. This request is then transmitted from the host's hardware frame modifier to each storage device, through the storage device's hardware frame modifier. Each device's hardware frame modifier thus receives a copy of all of the data, filters out all of the data except for the stripe destined for this particular storage device, and then forwards only the stripe to the storage device for storage.

The present invention provides for different approaches to retrieving striped data. One approach provides for the read request to be received by each device's hardware frame modifier. The striping filter in each device's hardware frame modifier then converts the read request into a read request for the particular stripe that is stored in the associated device. The filter also determines this stripe's position in the read, as well as determining the next stripe in line and the storage device that has stored that stripe. The striping filter then delivers the stripe stored in its device to the host's hardware frame modifier, and signals the next device's hardware frame modifier. The next device's filter then executes this process. This process continues until all of the original data has been delivered to the host's hardware frame modifier.

As another approach, the first device might send its data to both the host's hardware frame modifier, and the next device as the signal that the next device should begin transmitting its data.

Other approaches to mirroring and striping may be used and are described in detail below.

Various processes may be performed on a request as it is transmitted through the network. The system includes multiple different nodes that are each capable of performing one or more processes on a request. Each hardware frame modifier and each processing node may include forwarding tables that are used when transmitting a request.

For example, a request may require particular processes be performed on the request before it is received by its destination. The request may include an identification of each of these processes. As each node receives the request, the node executes its process on the request. The node determines from the request if there are any additional processes to be performed on the request. If there are additional processes, the node uses its forwarding tables to determine which node is capable of performing the process, and then forwards the request to that node. This continues until all processes have been performed and the request is transmitted to its destination device.

FIG. 1 is a block diagram of a data processing system 10 in accordance with the present invention. Data processing system 10 includes hosts 12 and 14 coupled to storage devices 16 and 18 through a network 19. A Virtual Storage Manager (VSM) 20 is also coupled to network 19.

Hosts 12 and 14 may be, for example, personal computers, portable computers, mobile or fixed user stations, workstations, network terminals or servers, cellular telephones, kiosks, dumb terminals, personal digital assistants, two-way pagers, smart phones, information appliances, or network computers. For purposes of this application, a network computer is any computer, coupled to a network, which receives a program or other application from another computer coupled to the network.

Network 19 includes nodes 26, 28, and 30. Network 19 also includes fabric 24 for routing data through network 19.

Network 19 is the medium used to provide communications links between various devices and computers connected together within data processing system 10. Network 19 may include connections, such as wire, wireless communication links, or fiber optic cables. Network 19 may include permanent connections, such as wire or fiber optic cables, or temporary connections made through telephone connections. The communications network 19 also can include other public and/or private wide area networks, local area networks, wireless networks, data communication networks or connections, intranets, routers, satellite links, microwave links, cellular or telephone networks, radio links, fiber optic transmission lines, ISDN lines, T1 lines, DSL, etc. Moreover, as used herein, communications include those enabled by wired or wireless technology.

A hardware frame modifier (HFM) is coupled between each host and the network, and between each storage device and the network. Host 12 is coupled to network 19 through hardware frame modifier 32. Host 14 is coupled to network 19 through hardware frame modifier 34. Storage device 16 is coupled to network through hardware frame modifier 36. Storage device 18 is coupled to network through hardware frame modifier 38.

Each hardware frame modifier may include one or all of the following: a frame modifier, virtualization tables, also called a virtual circuit table, forwarding tables, and a striping filter. HFM 32 includes frame modifier 40, virtual circuit table 42, forwarding tables 44, and striping filter 46. HFM 34 includes frame modifier 48, virtual circuit table 50, forwarding tables 52, and striping filter 54. HFM 36 includes frame modifier 56, virtual circuit table 58, forwarding tables 60, and striping filter 62. HFM 38 includes frame modifier 64, virtual circuit table 66, forwarding tables 68, and striping filter 70.

The frame modifier is used by the hardware frame modifier to determine the appropriate mapping of the storage device of the frames to a physical storage device. Based on this mapping, the hardware frame modifier changes the frame header to direct the frames directly to the physical storage device or the physical host without having to be sent to the virtual storage manager. The hardware frame modifier also uses the frame modifier to determine the appropriate conversion of command and status type.

The virtual circuit table is used by the hardware frame modifier to provide the information that is necessary to convert virtual addresses to physical addresses. The first time a command is received, the VSM determines the information that is necessary to convert the particular virtual address included in the command to the associated physical address. The VSM then stores this information in the appropriate HFM's virtualization, or virtual circuit, tables.

The forwarding tables are used by the hardware frame modifier to determine a next node to which to send the request.

The striping filter is used by the hardware frame modifier to select a particular stripe of data from then entire data.

These tables and filters may be implemented in either hardware or software.

The Virtual Storage Manager (VSM) may include a processor 72, non-volatile memory 74, volatile memory 76, and other devices 78.

Figure 2:
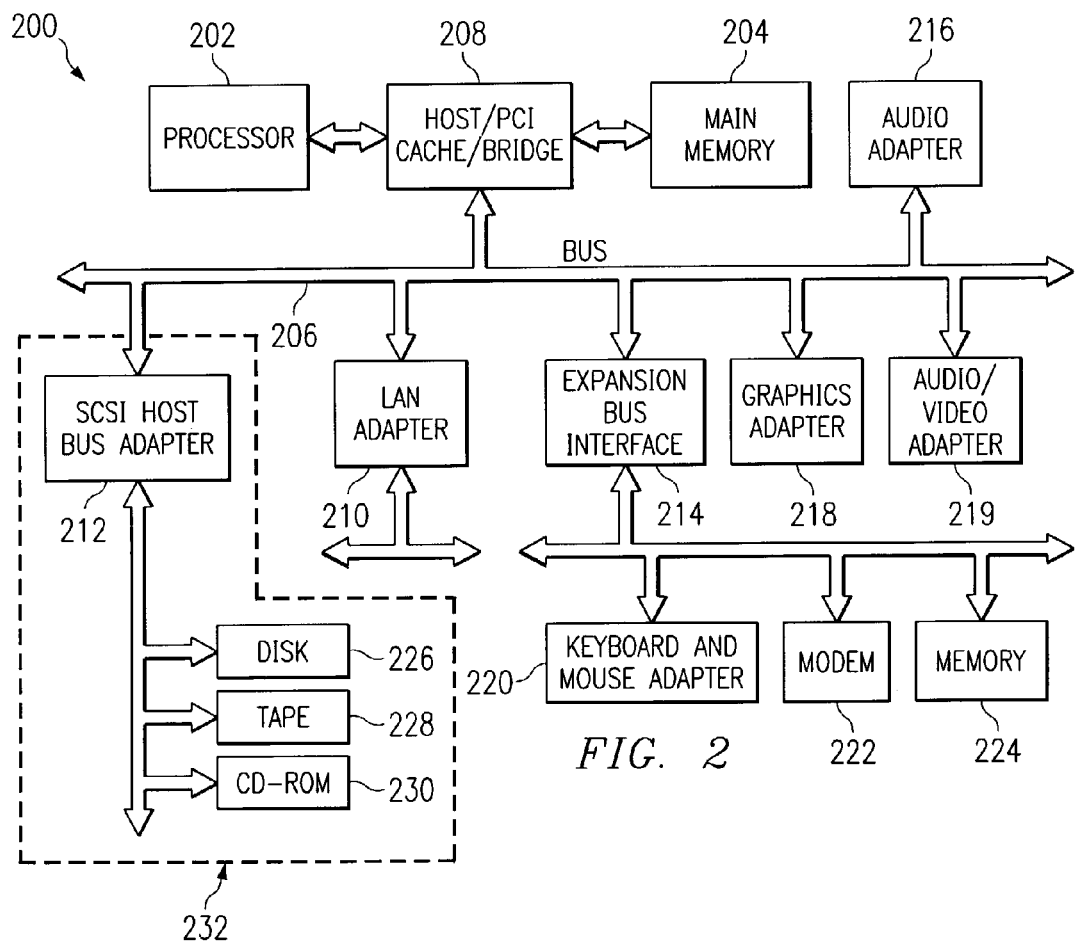
FIG. 2 is a block diagram of a data processing system that may be utilized to implement any of the computer systems or hosts described herein in accordance with the present invention.

FIG. 2 is a block diagram illustrating a data processing system that may be utilized to implement any of the computer systems or hosts described herein in accordance with the present invention. Data processing system 200 employs a peripheral component interconnect (PCI) local bus architecture. Although the depicted example employs a PCI bus, other bus architectures such as Accelerated Graphics Port (AGP) and Industry Standard Architecture (ISA) may be used. Processor 202 and main memory 204 are connected to PCI local bus 206 through PCI bridge 208. PCI bridge 208 also may include an integrated memory controller and cache memory for processor 202.

Additional connections to PCI local bus 206 may be made through direct component interconnection or through add-in boards. In the depicted example, local area network (LAN) adapter 210, SCSI host bus adapter 212, and expansion bus interface 214 are connected to PCI local bus 206 by direct component connection. In contrast, audio adapter 216, graphics adapter 218, and audio/video adapter 219 are connected to PCI local bus 206 by add-in boards inserted into expansion slots. Expansion bus interface 214 provides a connection for a keyboard and mouse adapter 220, modem 222, and additional memory 224. Small computer system interface (SCSI) host bus adapter 212 provides a connection for hard disk drive 226, tape drive 228, and CD-ROM drive 230. Typical PCI local bus implementations will support three or four PCI expansion slots or add-in connectors.

An operating system runs on processor 202 and is used to coordinate and provide control of various components within data processing system 200 in FIG. 2. An object oriented programming system such as Java may run in conjunction with the operating system and provide calls to the operating system from Java programs or applications executing on data processing system 200. "Java" is a trademark of Sun Microsystems, Inc. Instructions for the operating system, the object-oriented operating system, and applications or programs are located on storage devices, such as hard disk drive 226, and may be loaded into main memory 204 for execution by processor 202.

Those of ordinary skill in the art will appreciate that the hardware in FIG. 2 may vary depending on the implementation. Other internal hardware or peripheral devices, such as flash ROM (or equivalent nonvolatile memory) or optical disk drives and the like, may be used in addition to or in place of the hardware depicted in FIG. 2. Also, the processes of the present invention may be applied to a multiprocessor data processing system.

As another example, data processing system 200 may be a stand-alone system configured to be bootable without relying on some type of network communication interface, whether or not data processing system 200 comprises some type of network communication interface. As a further example, data processing system 200 may be a Personal Digital Assistant (PDA) device, which is configured with ROM and/or flash ROM in order to provide non-volatile memory for storing operating system files and/or user-generated data.

The depicted example in FIG. 2 and above-described examples are not meant to imply architectural limitations. For example, data processing system 200 also may be a notebook computer or hand held computer in addition to taking the form of a PDA. Data processing system 200 also may be a kiosk or a Web appliance.

Figure 3A:
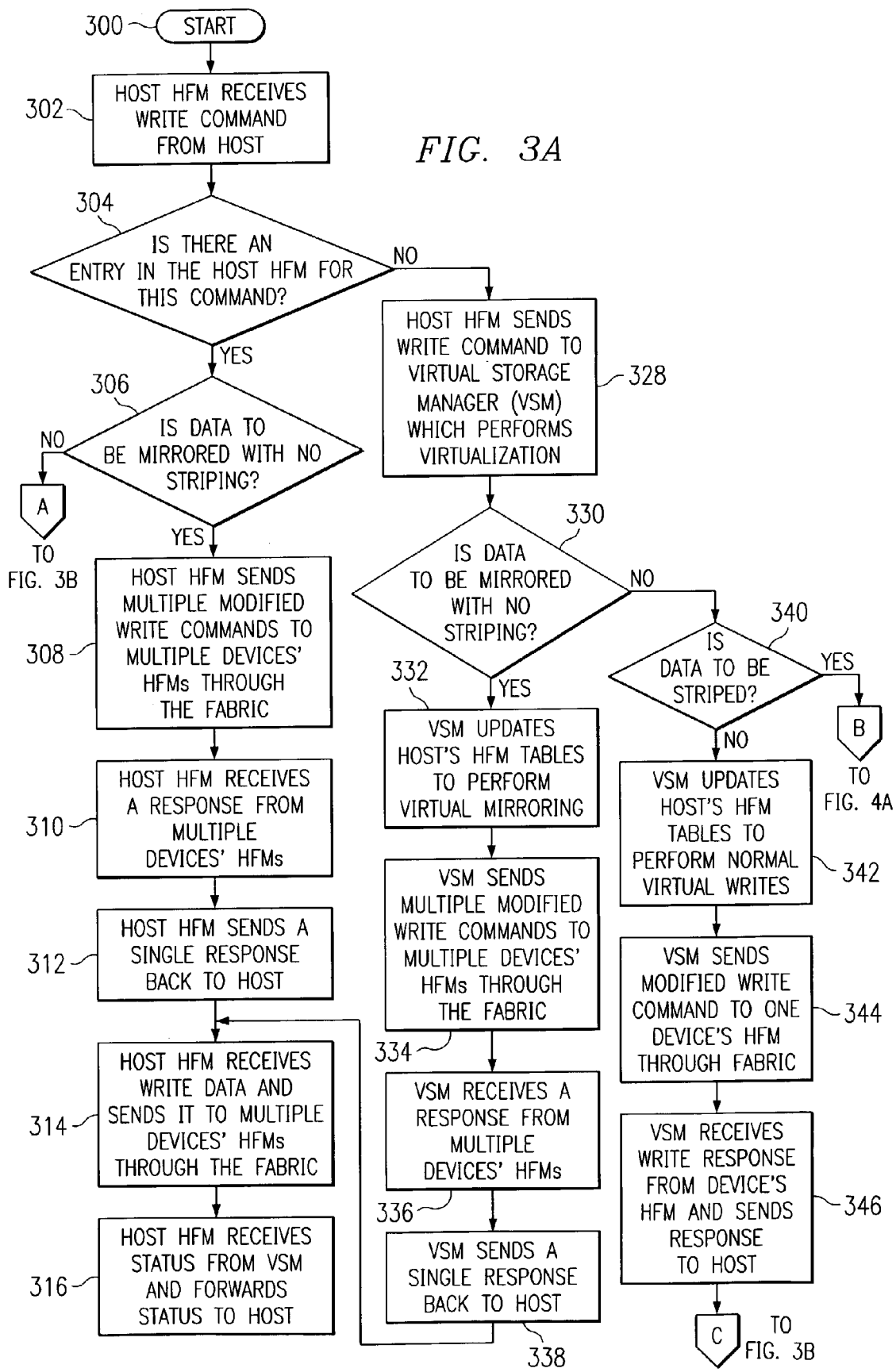
FIGS. 3A and 3B illustrate a high level flow chart that depicts a host writing mirrored and non-mirrored data to a storage device utilizing a hardware frame modifier in accordance with the present invention.
Figure 3B:
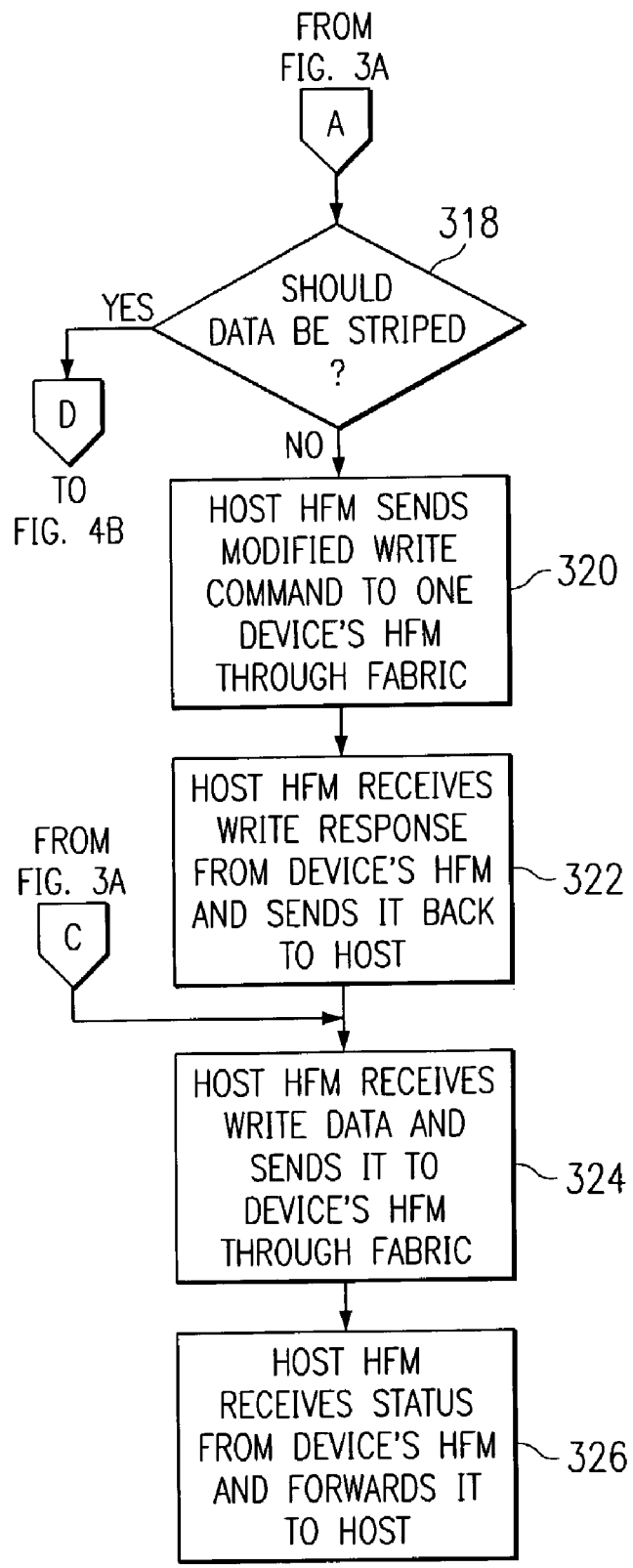

FIGS. 3A and 3B illustrate a high level flow chart that depicts a host writing mirrored and non-mirrored data to a storage device utilizing a hardware frame modifier in accordance with the present invention. The process starts as illustrated by block 300 and thereafter passes to block 302 which depicts a host HFM receiving a write command from a host. Next, block 304 illustrates a determination of whether or not there is an entry in the virtual circuit table of the host's HFM for this command. An entry will exist in the host's HFM for this command if the virtualization process has already been completed for this command. Referring again to block 304, if a determination is made that there is an entry in the host's HFM for this command, the process passes to block 306 which illustrates a determination of whether or not the data associated with this command is to be mirrored with no striping. If a determination is made that the data is to be mirrored but not striped, the process passes to block 308 which depicts the host HFM generating and sending multiple modified write commands to the multiple devices' HFMs through the fabric. The write command has been modified to include the virtualization information. Multiple copies of this modified write command are then transmitted, one to each appropriate device's HFM.

Thereafter, block 310 illustrates the host's HFM receiving a response from multiple devices' HFMs. The host's HFM, as depicted by block 312, then sends a single response back to the host. Next, block 314 illustrates the host's HFM receiving write data, and sending the write data to each one of the multiple devices' HFMs through the fabric. The process then passes to block 316 which depicts the host's HFM receiving a status from the virtual storage manager (VSM), and then forwarding this status to the host.

Referring again to block 306, if a determination is made that the data is not to be mirrored with no striping, the process passes to block 318 which illustrates a determination of whether or not the data is to be striped. If a determination is made that the data is to be striped, the process passes to block 450 (see FIG. 4*b*) as depicted through connector A. Referring again to block 318, if a determination is made that the data is not to be striped, the process passes to block 320 which illustrates the host's HFM sending the modified write command to one device's HFM through the fabric. The write command has been modified to include the virtualization information.

Block 322, then, depicts the host's HFM receiving a write response from the device's HFM, and then sending it to the host. Next, block 324, illustrates the host's HFM receiving the write data and sending it to the device's HFM through the fabric. Thereafter, block 326 depicts the host's HFM receiving a status from the device's HFM, and forwarding the status to the host.

Referring again to block 304, if a determination is made that there is no entry in the virtual circuit table of the host's HFM for this command, the process passes to block 328 which depicts the host's HFM sending the write command to the virtual storage manager (VSM) which then performs the virtualization for this command. Next, block 330 illustrates a determination of whether or not the data is to be mirrored with no striping. If a determination is made that the data is to be mirrored with no striping, the process passes to block 332 which depicts the VSM performing virtualization by updating the host's HFM virtual circuit tables by creating an entry in the host's HFM virtual circuit table for this command to perform mirroring.

The process then passes to block 334 which illustrates the VSM sending the multiple modified write commands to multiple devices' HFMs through the fabric. Next, block 336 depicts the VSM receiving a response from the multiple devices' HFMs. Thereafter, block 338 illustrates the VSM sending a single response back to the host. The process then passes to block 314.

Referring again to block 330, if a determination is made that the data is not to be mirrored with no striping, the process passes to block 340 which depicts a determination of whether or not the data is to be striped. If a determination is made that the data is not to be striped, the process passes to block 342 which illustrates the VSM updating the host's HFM tables to perform normal virtual writes. Thereafter, block 344 depicts the VSM sending the modified write command to one device's HFM through the fabric. Next, block 346 illustrates the VSM receiving a write response from the device's HFM, and then sending the response to the host. The process then passes to block 324.

Referring again to block 340, if a determination is made that the data is to be striped, the process passes to block 400 as illustrated through connector B.

FIG. 4*a* depicts a high level flow chart which illustrates a virtual storage manager providing virtualization when a host writes striped data to a storage device utilizing a hardware frame modifier in accordance with the present invention. Referring now to FIG. 4*a*, block 400 depicts a determination of whether or not the storage design supports replicated or distributed striping. If a determination is made that the storage design supports replicated striping, the process passes to block 402 which illustrates the VSM updating the host's HFM tables to perform replicated striping, and mirroring if appropriate. Thereafter, block 404 depicts the VSM sending a modified write command to multiple destintations for striping. Block 406, then, illustrates another set of modified write commands being sent to destinations as a mirrored copy of data if the data is to be mirrored.

The process then passes to block 408 which depicts the VSM receiving a response from the multiple devices' HFMs. Then, block 410 illustrates the VSM either sending a single response back to the host, or the VSM executing error handling as appropriate. Thereafter, block 412 depicts the host's HFM receiving write data and sending it to all destinations including all mirrored destinations if mirroring is required. Block 414, then, illustrates the host's HFM receiving a single status from the VSM. The host's HFM then returns a single status to the host.

Referring again to block 400, if a determination is made that the storage design supports replicated striping, the process passes to block 416 which depicts the VSM updating the host's HFM tables to perform distributed striping, and mirroring if appropriate. Next, block 418 illustrates the VSM sending a modified write command to multiple destinations for striping. Thereafter, block 420 depicts another set of modified write commands being sent to destinations as mirrored copies of the data if the data is to be mirrored. Block 422, then, illustrates the VSM receiving a response from the multiple devices' HFMs. The process then passes to block 424 which depicts the VSM either sending a single response back to the host or executing error handling as appropriate.

Next, block 426 illustrates the host's HFM receiving the write data. The host's HFM separates, or filters, the data into stripes using the host's HFM filtering tables. Thereafter, block 428 depicts the host's HFM sending the appropriate stripe of data to each device's HFM. Additional sets of striped data will go to additional device's HFM if multiple copies of the data are to be stored for mirroring. Block 430, then, illustrates the host's HFM receiving a single status from the VSM. The host's HFM returns a single status to the host.

FIG. 4*b* illustrates a high level flow chart which depicts a host writing striped data to a storage device utilizing a hardware frame modifier in accordance with the present invention. Block 450 depicts a determination of whether the storage design supports replicated or distributed striping. If a determination is made that the storage design supports replicated striping, the process passes to block 452 which illustrates the host's HFM sending a modified write command to multiple destinations for striping. Block 454, then, illustrates another set of modified write commands being sent to destinations as a mirrored copy of data if the data is to be mirrored.

The process then passes to block 456 which depicts the host's HFM receiving a response from the multiple devices' HFMs. Then, block 458 illustrates the host's HFM either sending a single response back to the host, or the host's HFM executing error handling as appropriate. Thereafter, block 460 depicts the host's HFM receiving write data and sending it to all devices that are to stored mirrored data if mirroring is required. Block 462, then, illustrates the host's HFM receiving a single status from the VSM. The host's HFM then returns a single status to the host.

Referring again to block 450, if a determination is made that the storage design supports distributed striping, the process passes to block 470 which depicts the host's HFM sending a modified write command to multiple destinations for striping. Thereafter, block 472 depicts another set of modified write commands being sent to destinations as mirrored copies of the data if the data is to be mirrored. Block 474, then, illustrates the host's HFM receiving a response from the multiple devices' HFMs. The process then passes to block 476, which depicts the host's HFM either sending a single response back to the host or executing error handling as appropriate.

Next, block 478 illustrates the host's HFM receiving the write data. The host's HFM separates, or filters, the data into stripes using the host's HFM filtering tables. Thereafter, block 480 depicts the host HFM sending the appropriate stripe of data to each device's HFM. Additional sets of striped data will go to additional device's HFM if multiple copies of the data are to be stored for mirroring. Block 482, then, illustrates the host's HFM receiving a single status from the VSM. The host's HFM returns a single status to the host.

Figure 5:
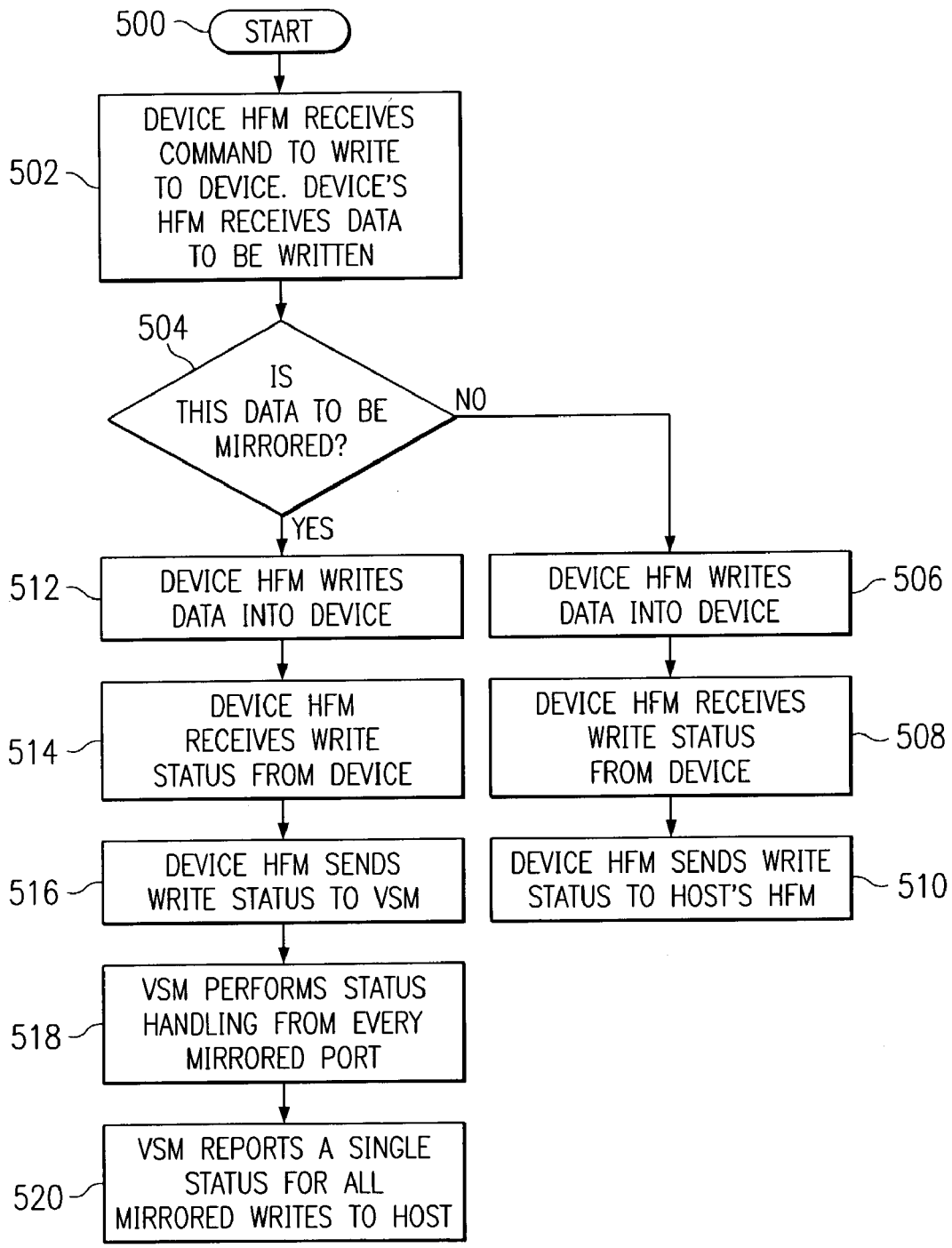
FIG. 5 illustrates a high level flow chart which depicts a storage device's hardware frame modifier writing data to a storage device in accordance with the present invention.

FIG. 5 illustrates a high level flow chart which depicts a storage device's hardware frame modifier writing data to a storage device in accordance with the present invention. The process starts as depicted by block 500 and thereafter passes to block 502 which illustrates a device's HFM receiving a command to write to a device. The device's HFM also receives the data to be written. Next, block 504 depicts a determination of whether or not this data is to be mirrored. If a determination is made that the data is not to be written, the process passes to block 506 which illustrates the device's HFM writing data into the device. Thereafter, block 508 depicts the device's HFM receiving a write status from the device. Block 510, then, illustrates the device's HFM sending the write status to the host's HFM.

Referring again to block 504, if a determination is made that the data to be written is to be mirrored, the process passes to block 512 which depicts the device's HFM writing data into the device. Next, block 514 illustrates the device's HFM receiving a write status from the device. The process then passes to block 516 which depicts the device's HFM sending the write status to the VSM. Thereafter, block 518 illustrates the VSM performing status handling from every mirrored port. Block 520, then, depicts the VSM reporting a single status to the host that represents all mirrored writes.

Figure 6:
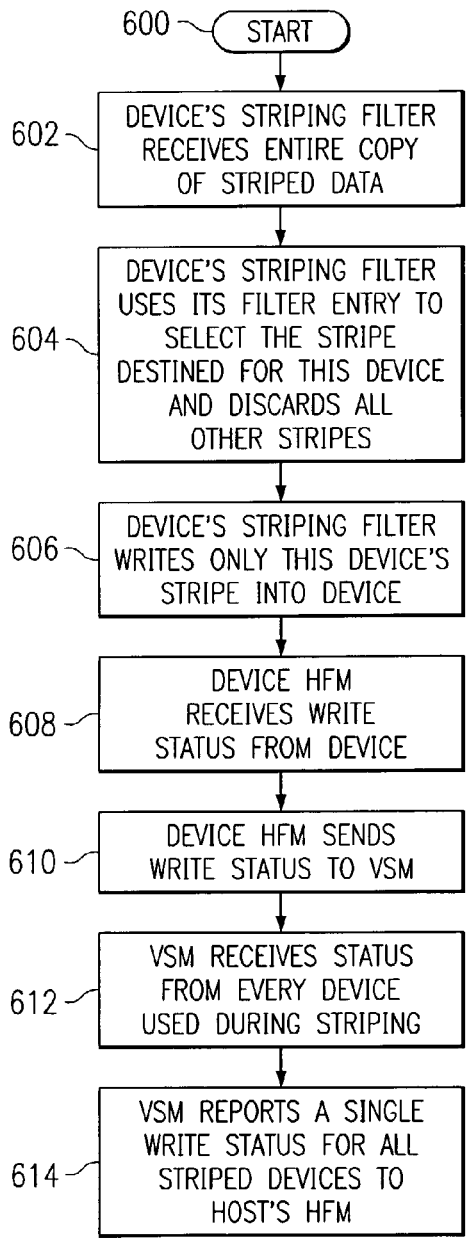
FIG. 6 depicts a high level flow chart which illustrates a device receiving a copy of all of the data and selecting only its stripe utilizing a striping filter included in the device's hardware frame modifier in accordance with the present invention.

FIG. 6 depicts a high level flow chart which illustrates a device receiving a copy of all of the data and selecting only its stripe utilizing a striping filter that is included in the device's hardware frame modifier in accordance with the present invention. The process starts as illustrated by block 600 and thereafter passes to block 602 which depicts the device's striping filter receiving the entire copy of the data to be striped. Next, block 604 illustrates the device's striping filter using its filter entry to select the stripe destined for this device and discarding all other data stripes. The process then passes to block 606 which depicts the device's striping filter writing only this device's stripe into the device. Block 608, then, illustrates the device's HFM receiving a write status from the device. Thereafter, block 610 depicts the device's HFM sending the write status to the VSM. Then, block 612 illustrates the VSM receiving a status from every device used during striping. The process then passes to block 614 which depicts the VSM reporting to the host's HFM a single write status for all striped devices.

Figure 7:
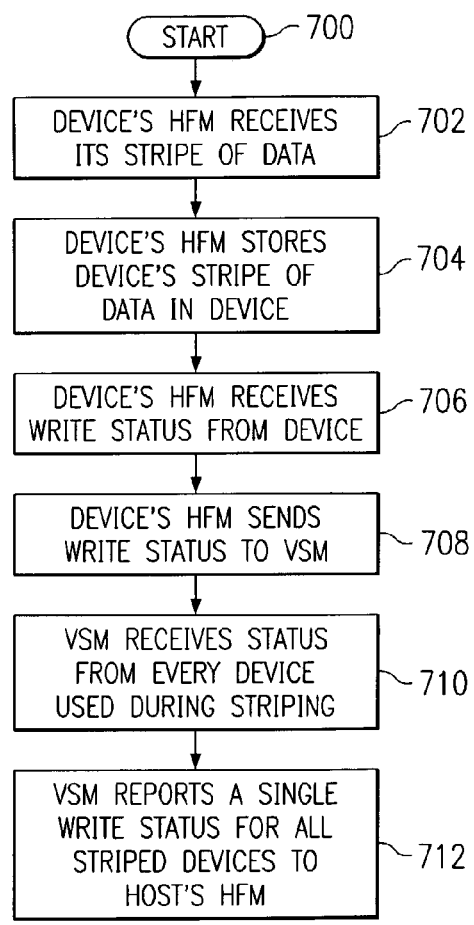
FIG. 7 illustrates a high level flow chart which depicts a device receiving its stripe of data through the device's hardware frame modifier in accordance with the present invention.

FIG. 7 illustrates a high level flow chart which depicts a device receiving its stripe of data through the device's hardware frame modifier in accordance with the present invention. The process starts as depicted by block 700 and thereafter passes to block 702 which illustrates the device's HFM receiving its stripe of data. Next, block 704 depicts the device's HFM storing the device's stripe of data in the device. The process then passes to block 706 which illustrates the device's HFM receiving a write status from the device.

Thereafter, block 708 depicts the device's HFM sending the write status to the VSM. Block 710, then, illustrates the VSM receiving a write status from every device used during striping. The process then passes to block 712 which depicts the VSM reporting a single write status for all striped devices to the host's HFM.

Figure 8:
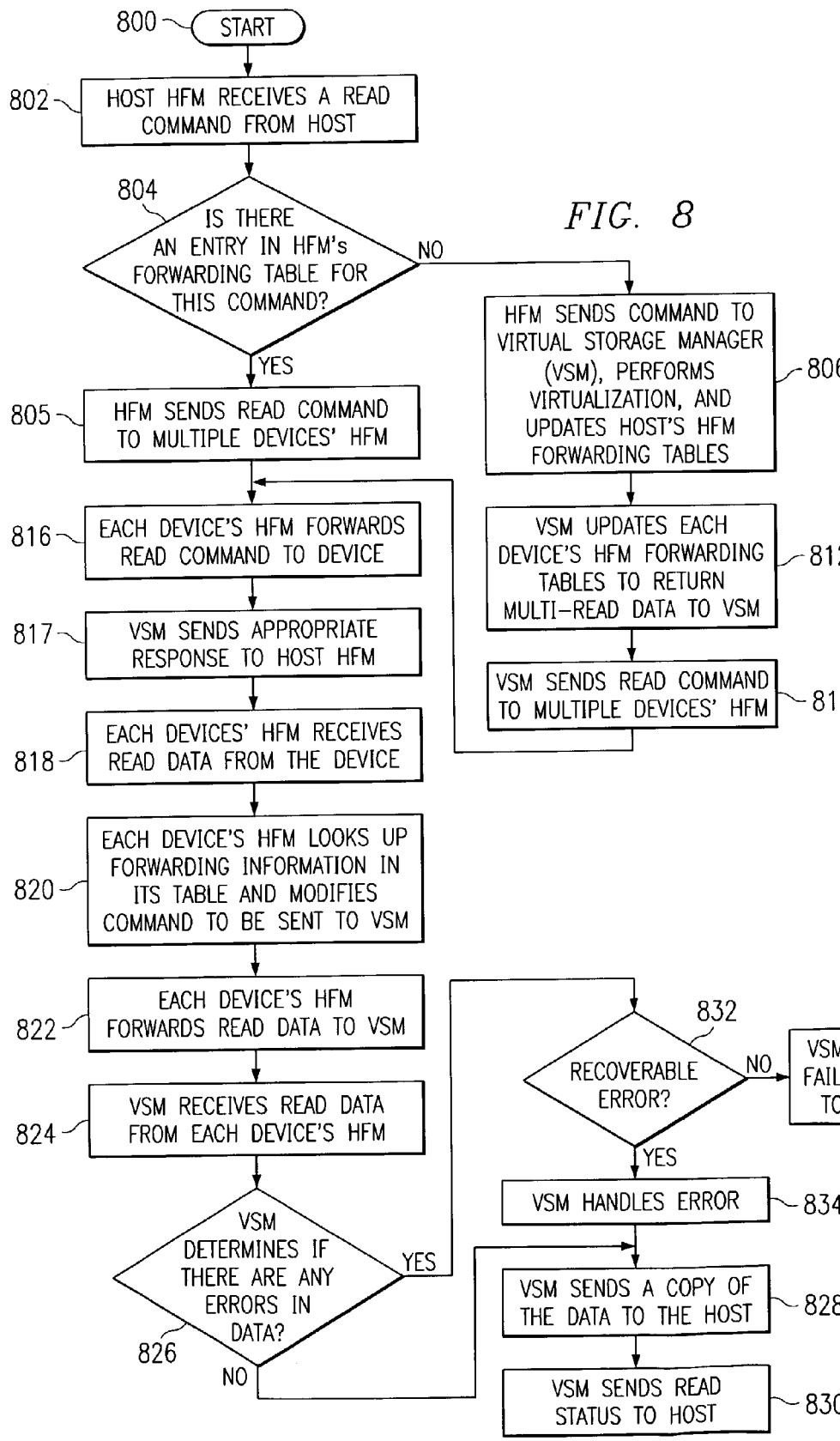
FIG. 8 depicts a high level flow chart which illustrates a host reading data from a storage device utilizing hardware frame modifiers where a virtual storage manager processes errors in accordance with the present invention.

FIG. 8 depicts a high level flow chart which illustrates a host reading data from a storage device utilizing hardware frame modifiers where a virtual storage manager processes errors in accordance with the present invention. The process starts as depicted by block 800 and thereafter passes to block 802 which illustrates the host's HFM receiving a read command from a host. Next, block 804 depicts a determination of whether or not there is an entry in the host's HFM's forwarding table for this frame. If there is a determination that there is an entry in the HFM's forwarding table for this command, the process passes to block 805 which illustrates the HFM sending the read command to multiple devices' HFM. The process then passes to block 816.

Referring again to block 804, if a determination is made that there is not an entry in the host's HFM's forwarding table for this command, the process passes to block 806 which depicts the host's HFM sending the command to the Virtual Storage Manager (VSM). The VMS performs virtualization and updates the host's HFM forwarding tables. Thereafter, block 812 illustrates the VSM updating each device's HFM forwarding tables to return multi-read data to the VSM. Block 814, then, depicts the VSM sending the read command to the multiple devices' HFM. The process then passes to block 816.

Block 816 illustrates each device's HFM forwarding the read command to the device. Thereafter, block 817 depicts the VSM sending an appropriate response to the host's HFM. Next, block 818 illustrates each device's HFM receiving read data from the device. The process then passes to block 820 which depicts each device's HFM looking up forwarding information in its forwarding tables and modifying the command to be sent to the VSM.

Thereafter, block 822 illustrates each device's HFM forwarding read data to the VSM. Next, block 824 depicts the VSM receiving read data from each device's HFM. Block 826, then, illustrates a determination of whether or not the VSM determines that there are any errors in the data. If a determination is made that there are no errors in the data, the process passes to block 828 which illustrates the VSM sending a copy of the data to the host. The process then passes to block 830 which depicts the VSM sending a read status to the host.

Referring again to block 826, if a determination is made that there is an error in the data, the process passes to block 832 which depicts a determination of whether or not the error is a recoverable error. If a determination is made that the error is a recoverable error, the process passes to block 834 which illustrates the VSM handling the error. The process then passes back to block 828.

Referring again to block 832, if a determination is made that the error is not a recoverable error, the process passes to block 836 which depicts the VSM sending a failure status to the host.

Figure 9:
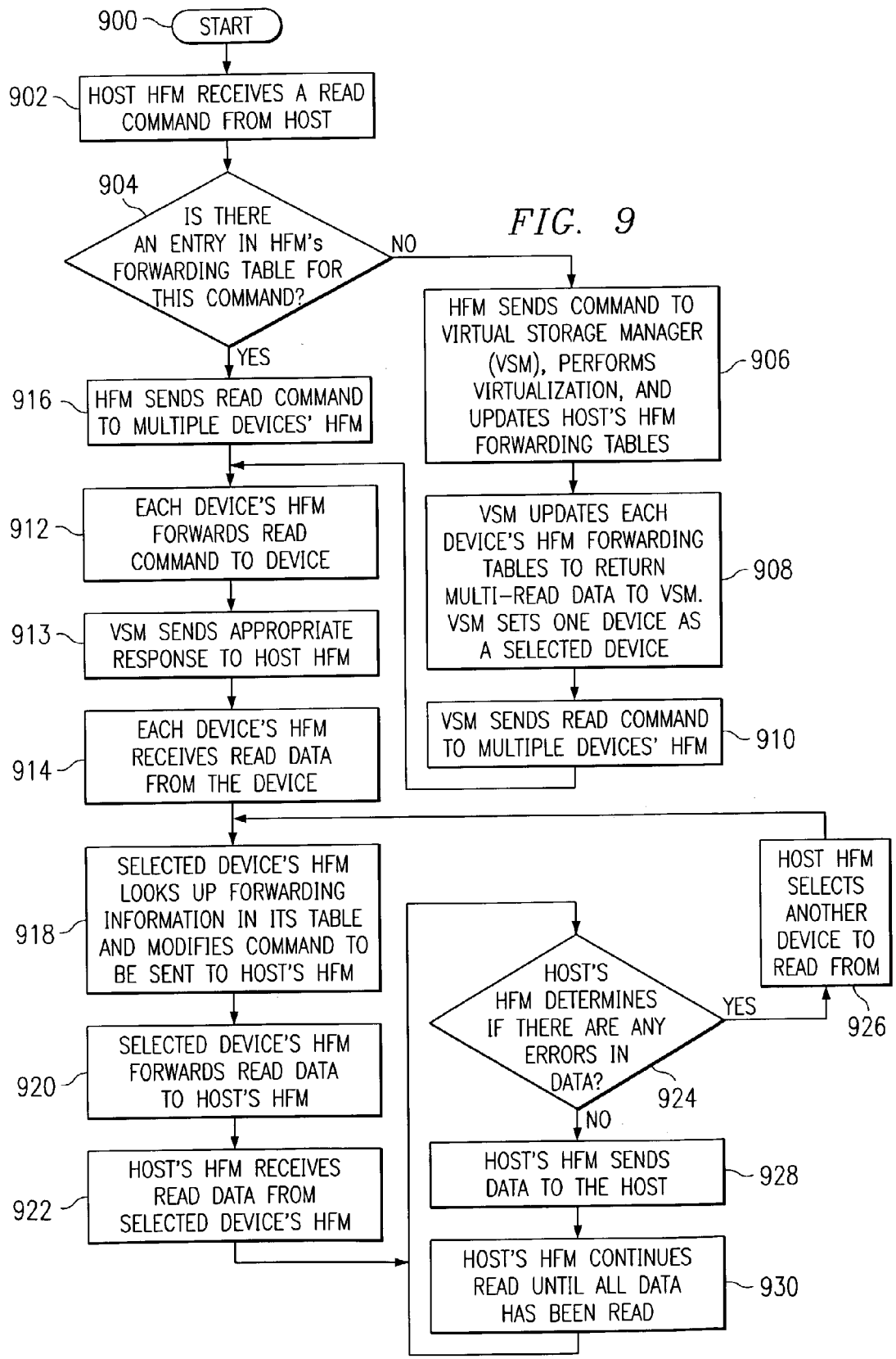
FIG. 9 illustrates a high level flow chart which depicts a host reading data from a storage device utilizing hardware frame modifiers where the host's hardware frame modifier processes errors in accordance with the present invention.

FIG. 9 illustrates a high level flow chart which depicts a host reading data from a storage device utilizing hardware frame modifiers where the host's hardware frame modifier processes errors in accordance with the present invention. The process starts as depicted by block 900 and thereafter passes to block 902 which illustrates the host's HFM receiving a read command from the host. Next, block 904 depicts a determination of whether or not there is an entry in the host's HFM's forwarding table for this command. If there is a determination that there is an entry in the host's HFM's forwarding table for this command, the process passes to block 916 which illustrates the host's HFM sending the read command to multiple devices' HFM. The process then passes to block 912.

Referring again to block 904, if a determination is made that there is not an entry in the host's HFM's forwarding table for this command, the process passes to block 906 which depicts the host's HFM sending the command to the Virtual Storage Manager (VSM). The VMS performs virtualization and updates the host's HFM forwarding tables. Thereafter, block 908 illustrates the VSM updating each device's HFM forwarding tables to return multi-read data to the VSM. The VSM sets one device as a selected device. Block 910, then, depicts the VSM sending the read command to the multiple devices' HFM. The process then passes to block 912.

Block 912 illustrates each device's HFM forwarding the read command to the device. Thereafter, block 913 depicts the VSM sending an appropriate response to the host's HFM. Next, block 914 illustrates each device's HFM receiving read data from the device. The process then passes to block 918 which depicts the selected device's HFM looking up forwarding information in its tables and modifying the command to be sent to the host's HFM.

Thereafter, block 920 illustrates the selected device's HFM forwarding read data to the host's HFM. Next, block 922 depicts the host's HFM receiving read data from the selected device's HFM. Block 924, then, illustrates a determination of whether or not the host's HFM determines that there are any errors in the data. If a determination is made that there are no errors in the data, the process passes to block 928 which illustrates the host's HFM sending the data to the host. The process then passes to block 930 which depicts the host's HFM continuing the read until all data has been read.

Referring again to block 924, if a determination is made that there is an error in the data, the process passes to block 926 which depicts the host's HFM selecting another device from which to read. The process then passes back to block 918.

Figure 10:
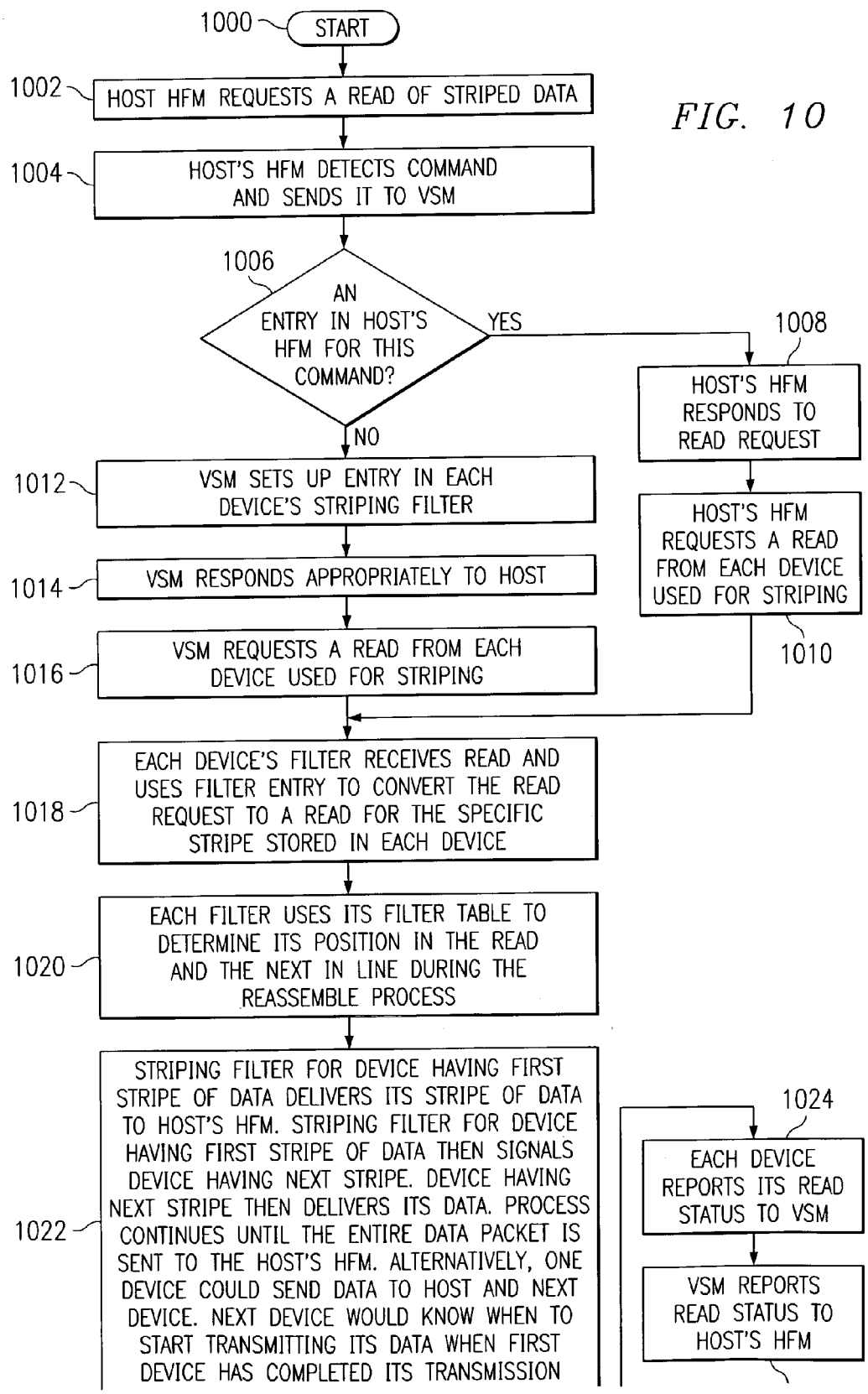
FIG. 10 depicts a high level flow chart which illustrates a host reading striped data from a storage device utilizing hardware frame modifiers and a virtual storage manager in accordance with the present invention.

FIG. 10 depicts a high level flow chart which illustrates a host reading striped data from a storage device utilizing hardware frame modifiers and a virtual storage manager in accordance with the present invention. The process starts as depicted by block 1000, and thereafter passes to block 1002 which illustrates a host's HFM requesting a read of striped data. Next, block 1004 depicts the host's HFM detecting the command and sending it to the VSM.

Block 1006, then, illustrates a determination of whether or not there is an entry in the host's HFM for this command. If there is a determination that there is an entry in the host's HFM for this command, the process passes to block 1008 which depicts the host's HFM responding to the read request. Thereafter, block 1010 illustrates the host's HFM requesting a read from each device used for striping. The process then passes to block 1018.

Referring again to block 1006, if a determination is made that there is not an entry in the host's HFM for this command, the process passes to block 1012 which depicts the VSM setting up an entry in each device's striping filter. Thereafter, block 1014 illustrates the VSM responding appropriately to the host. The process then passes to block 1016 which depicts the VSM requesting a read from each device used for striping.

Block 1018, then, illustrates each device's filter receiving the read and using the filter entry to convert the read request to a read for the specific stripe that is stored in each device. Next, block 1020 depicts each filter using its filter table to determine its position in the read and the next in line during the reassemble process. Thereafter, block 1022 illustrates the striping filter for the device having the first stripe of data delivering its stripe of data to the host's HFM. The striping filter for this device having the first strip of data then signals the device having the next stripe of data. The device having the next stripe then delivers its data. This process continues until the entire original data is sent to the host's HFM. Alternatively, one device could send data both to the host and the next device. The next device would know when to start transmitting its data when the first device has completed its transmission.

Thereafter, block 1024 depicts each device reporting its read status to the VSM. The process then passes to block 1026 which illustrates the VSM reporting a read status to the host's HFM.

Figure 11:
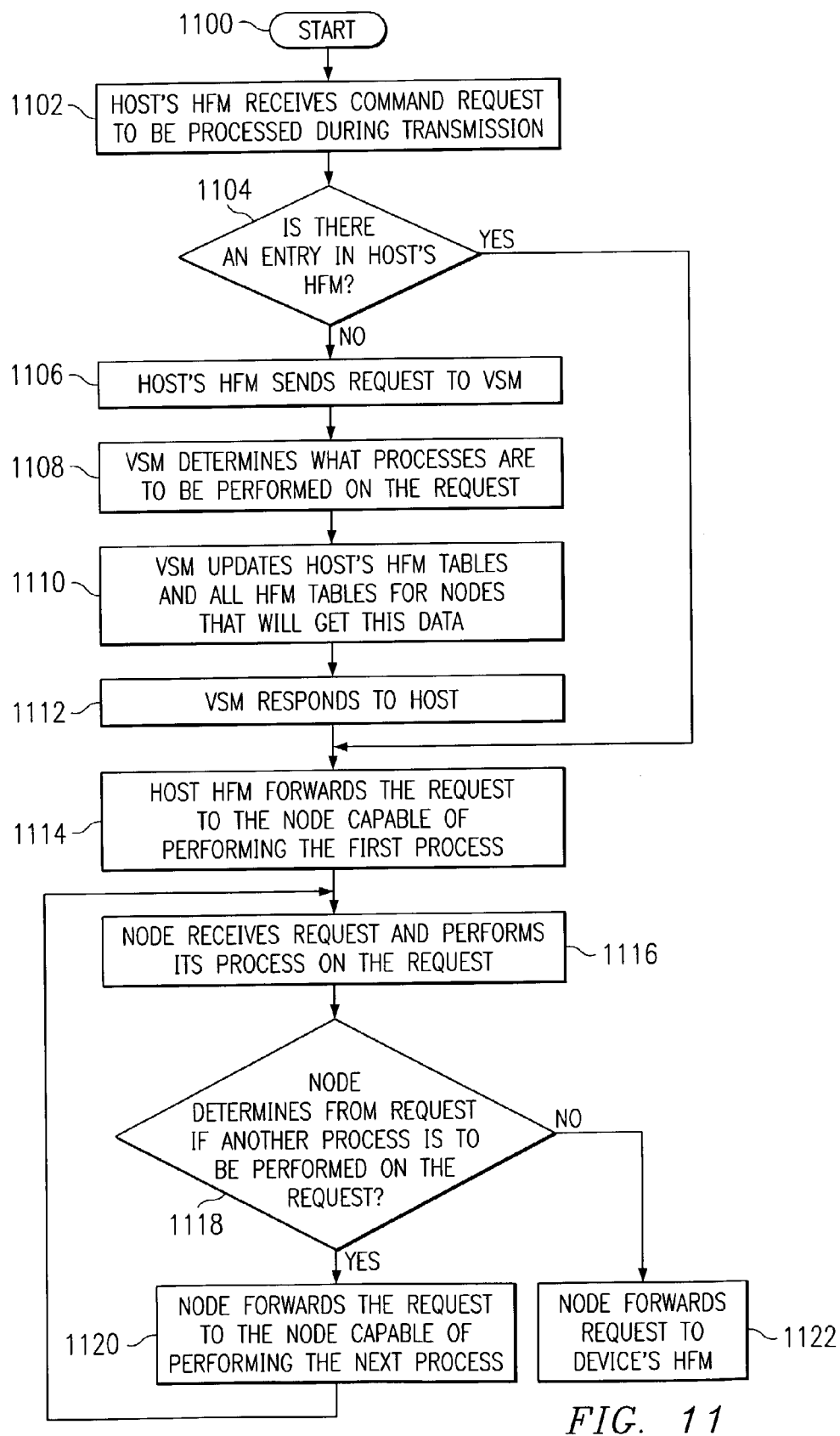
FIG. 11 illustrates a high level flow chart which depicts a host writing data to a storage device where the data is processed during its transmission utilizing various nodes included in the network in accordance with the present invention.

FIG. 11 illustrates a high level flow chart which depicts a host writing data to a storage device where the data is processed during its transmission utilizing various nodes included in the network in accordance with the present invention. The process starts as illustrated by block 1100, and thereafter passes to block 1102 which depicts the host's HFM receiving a command request to be processed during transmission. Next, block 1104 illustrates a determination of whether or not there is an entry in the host's HFM for this command. If a determination is made that there is an entry in the host's HFM for this command, the process passes to block 1114.

Referring again to block 1104, if a determination is made that there is not an entry in the host's HFM for this command, the process passes to block 1106 which depicts the host's HFM sending the request to the VSM. The process then passes to block 1108 which illustrates the VSM determining what processes are to be performed on the request. Next, block 1110 depicts the VSM updating the host's HFM tables and all HFM tables for nodes that will get this data for either processing or forwarding.

The process then passes to block 1112 which illustrates the VSM responding to the host. Thereafter, block 1114 depicts the host HFM forwarding the request to the node that is capable of performing the first process. Next, block 1116 illustrates the node receiving the request and performing its process on the request. Block 1118, then, depicts the node determining from the request if another process is to be performed on the request. If a determination is made by the node that another process is to be performed on the request, the process passes to block 1120 which depicts the node forwarding the request to the node capable of performing the next process. The process passes back to block 1116. Referring again to block 1118, if a determination is made by the node that another process is not to be performed on the request, the process passes to block 1122 which illustrates the node forwarding the request to the device's HFM.

FIG. 12 depicts a high level flow chart which illustrates a host reading data from a storage device where the data was processed when it was transmitted to be stored utilizing various nodes included in the network in accordance with the present invention. The process starts as depicted by block 1200, and thereafter passes to block 1202 which illustrates the host's HFM receiving a command to read data that was processed during its transmission. Next, block 1204 depicts the host's HFM transmitting the read command directly to the appropriate storage device. The process then passes to block 1208 which illustrates the device's HFM reading the data from the device. Thereafter, block 1210 depicts the device's HFM forwarding the frame of data to the node that is capable of performing the first process in the reverse order. Thereafter, block 1212 illustrates the node receiving the frame and performing its process on the frame.

The process then passes to block 1214 which depicts the node using its table to determine if another process is to be performed on the data. If a determination is made that another process is to be performed on the data, the process passes to block 1216 which illustrates the node determining from the frame a next process to be performed. Next, block 1220 depicts this node using its tables to determine a next node that is capable of performing this next process, and then forwarding the frame to the next node. The process then passes to block 1214.

Referring again to block 1214, if a determination is made that no other process is to be performed on this data, the process passes to block 1222 which depicts this node forwarding the frame to the host's HFM.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, CD-ROMs, and transmission-type media such as digital and analog communications links.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for managing a storage system that includes a plurality of storage devices, said method comprising the steps of:

receiving a first command from a host to store data utilizing a first storage scheme of a plurality of storage schemes;

determining ones of said plurality of storage devices on which to store the data according to said first storage scheme;

generating at least one second command to write data according to said first storage scheme to said ones of said plurality of storage devices in response to said receipt of said first command;

transmitting said at least one second command to said ones of said plurality of storage devices; and storing said data in said ones of said plurality of storage device according to said first storage scheme in response to a receipt of said at least one second command;

wherein said plurality of storage schemes includes the ability to perform writes with at least one of (a) mirroring but no striping and (b) both mirroring and striping.

2. The method according to claim 1, wherein said plurality of storage schemes further includes the ability to perform writes with at least one of (c) sting but no mirroring and (d) neither mirroring nor striping.

3. The method according to claim 1, further comprising the step of:

receiving a first command from a host to store data utilizing a data striping storage scheme.

4. The method according to claim 1, further comprising the steps of:

determining that said first storage scheme is a distributed striping scheme;

generating a plurality of second commands;

each one of said plurality of second commands including a different stripe of said data; and transmitting each one of said plurality of second commands to at least one of said plurality of storage devices and;

storing a different stripe of said data in said at least one of said plurality of storage devices.

5. The method according to claim 1, further comprising the steps of:

determining that said first storage scheme is a replicated striping scheme;

transmitting said at least one second command to a different striping filter associated with each one of said ones of said plurality of storage devices;

said second command included all of said data, wherein a stripe of said data is to be stored in each one of said ones of said plurality of storage devices, her wherein each said different striping filter received all of said data;

filtering all of said data by each said different striping filter to obtain a stripe of said data that is to be stored in one of said plurality of storage devices that is associated with said striping filter; and storing said stripe of said data in said one of said plurality of storage devices that is associated with said striping filter.

6. The method according to claim 1, further comprising the steps of:

receiving said first command within a hardware frame modifier device;

determining, by said hardware frame modifier device, whether said first command is a command to store ad data in at least one virtual storage device;

in response to a determination that said first command is a command to store said data in at least one virtual storage device, determining whether said hardware frame modifier device includes information for converting said at least one storage device to at least one physical storage device;

in response to a determination that said hardware frame modifier does not include said information for converting, transmitting said first command to a viral storage manager from said hardware frame modifier device;

converting said at least one virtual device to at least one physical storage device by said virtual storage manager;

updating, by said virtual storage manager, said hardware frame modifier device to include information for converting said at least one virtual device to at least one physical storage device; and transmitting, from said virtual storage manager, said at least one second command to said at least one physical storage device.

7. The method according to claim 6, further comprising the steps of:
in response to a determination that said hardware frame modifier does include said information for converting, converting said at least one virtual device to at least one physical storage device by said hardware frame modifier device; and
transmitting, from said hardware frame modifier device, said at least one second command to said at least one physical storage device.

8. The method according to claim 1, further comprising the step of:
receiving a first command from a host to store data utilizing a data mirroring storage scheme.

9. The method according to claim 8, further comprising the steps of:
determining that said first storage scheme is a data mirroring scheme;
generating a plurality of second commands, each one of said plurality of second commands including a duplicate copy of said data, each one of said plurality of second commands including a different storage address;
transmitting each one of said plurality of second commands to said ones of said plurality of storage devices; and
storing said duplicate copy of said data in said different storage addresses in said ones of said plurality of storage devices.

10. A method in a data processing system for managing a storage system that includes a plurality of storage devices, said method comprising the steps of:
receiving within a host's hardware frame modifier device a first command from a host to read data from at least one virtual storage device that was stored utilizing a first storage scheme of a plurality of storage schemes;
determining whether said hardware fame modifier device includes information for converting said at least one virtual storage device to at least one physical storage device;
in response to a determination that said hardware frame modifier does not include said information for converting, transmitting said first command to a virtual storage manager from said hardware frame modifier device;
converting said at least one virtual device to at least one physical storage device by said virtual storage manager;

updating, by said virtual storage manager, said hardware frame modifier device to include information for converting said at least one virtual device to at least one physical storage device; and transmitting from said virtual storage manager to said at least one physical storage device, at least one second command to read said data from said at least one physical storage device;

wherein said plurality of storage schemes includes the ability to perform writes with at least one of (a) mirroring but no striping and (b) both mirroring and striping.

11. The method according to claim 10, further comprising the steps of:
in response to a determination that said hardware frame modifier does include said information for converting, converting said at least one virtual device to at least one physical storage device by said hardware frame modifier device; and
transmitting, from said host's hardware frame modifier to said at least one physical storage device, at least one second command to read said data from said at least one physical storage device.

12. The method according to claim 11, further comprising the steps of:
receiving within a host's hardware frame modifier device a fit command from a host to read data from at least one virtual storage device that was stored utilizing a data mirroring storage scheme;
generating a plurality of second commands to read data from each one of a plurality of physical storage devices where a mirrored copy of said data was stored;
receiving each of said mirrored copy of said data within said virtual storage manager;
determining, by said virtual storage manager, whether there is an error in any of said each of said mirrored copy of said data; and
in response to a determination by said virtual storage manager that there is no error in any of said each of said mirrored copy of said data, transmitting one copy of said mirrored data to said host.

13. The method according to claim 12, further comprising the steps of:
in response to a determination by said virtual storage manager that there is an error in at least one of said each of said mirrored copy of said data, determining, by said virtual storage manager, whether said error is a recoverable error; and
in response to a determination that said error is a recoverable error, correcting said error and transmitting an error-free copy of said mirrored data to said host.

14. The method according to claim 11, further comprising the steps of:
receiving within a host's hardware frame modifier device a first command from a host to read data from at least one virtual storage device that was stored utilizing a data mirroring storage scheme;
generating a second command to read said data from one of a plurality of physical storage devices where a mirrored copy of said data was stored;
receiving said mirrored copy of said data within said virtual storage manager from said one of said plurality of storage devices;
determining, by said virtual storage manager, whether there is an error in said mirrored copy of said data; and in response to a determination by said virtual storage manager that there is no error in said mirrored copy of said data, transmitting said mirrored data to said host.

15. The method according to claim 12, further comprising the steps of:
in response to a determination by said virtual storage manager that there is an error in said mirrored copy of said data, generating a third command to read said data from a second one of said plurality of physical storage devices where a second mirrored copy of said data was stored;
receiving said second mirrored copy of said data within said virtual storage manager from said second one of said plurality of storage devices;
determining, by said virtual storage manager, whether there is an error in said second mirrored copy of said data; and
in response to a determination by said virtual storage manager that there is no error in said second mirrored copy of said data, transmitting said second mirrored data to said host.

16. The method according to claim 11, further comprising the steps of:
receiving a first command to read data that was stored in a plurality of physical storage devices utilizing a data striping storage scheme;
for each one of said plurality of storage devices, creating an entry in a striping filter that is associated with each one of said plurality of physical storage devices for converting said command to read only a stripe of said data that was stored in said each one of said plurality of physical storage devices;
determining, by each said striping filter, a position of said one of said plurality of physical storage devices associated with said each striping filter within said read; and
for each one of said plurality of storage devices, transmitting a stripe of data from said one of said plurality of physical storage devices at said one of said plurality of physical swap device's position with said read.

17. A data processing system for managing a storage system that includes a plurality of storage devices, said system comprising:
receiving means for receiving a first command from a host to store data utilizing a first storage scheme of a plurality of storage schemes;
determining means for determining ones of said plurality of storage devices on which to store the data according to said first storage scheme;
generating means for generating at least one second command to write data according to said first storage scheme to said ones of said plurality of storage devices in response to said receipt of said first command;
transmitting means for transmitting said at least one second command to said ones of said plurality of storage devices; and
storing means for storing said data in said ones of said plurality of storage device according to said first storage scheme in response to a receipt of said at least one second command;
wherein said plurality of storage schemes includes the ability to perform writes with at least one of (a) mirroring but no striping and (b) both mirroring and striping.

18. The system according to claim 17, wherein said plurality of storage schemes further includes the ability to perform writes with at least one of (c) striping but no mirroring and (d) neither mirroring nor striping.

19. The system according to claim 17, further comprising:
receiving means for receiving a first command from a host to store data utilizing a data striping storage scheme.

20. The system according to claim 19, fiber comprising:
generating means for generating a plurality of second commands;
each one of said plurality of second commands including a different stripe of said data; and
transmitting means for transmitting each one of said plurality of second commands to at least one of said plurality of storage devices; and
storing means for storing a different stripe of said data in said at least one of said plurality of storage devices.

21. The system according to claim 17, further comprising:
transmitting means for transmitting said at least one second command to a different striping filter associated with each one of said ones of said plurality of storage devices;
said second command included all of said data, wherein a stripe of said data is to be stored in each one of said ones of said plurality of storage devices, further wherein each said different striping filter received all of said data;
filtering means for filtering all of said data by each said different striping filter to obtain a stripe of said data that is to be stored in one of said plurality of storage devices that is associated with said striping filter, and
storing means for storing said stripe of said data in said one of said plurality of storage devices that is associated with said striping filter.

22. The system according to claim 17, further comprising:
receiving means for receiving said first command within a hardware frame modifier device;
determining means for determining, by said hardware frame modifier device, whether said first command is a command to store said data in at least one virtual storage device;
in response to a determination that said first command is a command to store said data in at least one virtual storage device, determining means for determining whether said hardware frame modifier device includes information for converting said at least one virtual storage device to at least one physical storage device;
in response to a determination that said hardware frame modifier does not include said information for converting transmitting means for transmitting said first command to a virtual storage manager from said hardware frame modifier device;
converting means for converting said at least one virtual device to at least one physical storage device by said virtual storage manager,
updating means for updating, by said virtual storage manager, said hardware frame modifier dice to include information for converting said at least one virtual device to at least one physical storage device; and
transmitting means for transmitting from said virtual storage manager, said at least one second command to said at least one physical storage device.

23. The system according to claim 22, further comprising:
in response to a determination that said hardware frame modifier does include said information for converting, converting means for converting said at least one vir device to at least one physical storage device by said hardware frame modifier device; and
transmitting means for transmitting, from said hardware frame modifier device, said at least one second command to said at least one physical storage device.

24. The system according to claim 17, further comprising:
receiving means for receiving a first command from a host to store data utilizing a data mirroring storage scheme.

25. The system according to claim 24, further comprising:
generating means for generating a plurality of second commands, each one of said plurality of second commands including a duplicate copy of said data, each one of said plurality of second commands including a different storage address;
transmitting means for transmitting each one of said plurality of second commands to said ones of said plurality of storage devices; and
storing means for storing said duplicate copy of said data in said different storage addresses in said ones of said plurality of storage devices.

26. A data processing system for managing a storage system that includes a plurality of storage devices, said system comprising:
receiving means for receiving within a host's hardware fame modifier device a first command from a host to read data from at least one virtual storage device that was stored utilizing a first storage scheme of a plurality of storage schemes;
determining means for determining whether said hardware frame modifier device includes information for converting said at least one virtual storage device to at least one physical storage device;
in response to a determination that said hardware frame modifier does not include said information for converting, transmitting means for transmitting said first command to a virtual storage manager from said hardware frame modifier device;
converting means for converting said at least one virtual device to at least one physical storage device by said virtual manager;
updating means for updating, by said virtual store manager, said hardware frame modifier device to include information for converting said at least one virtual device to at least one physical storage device; and
transmitting means for transmitting, from said virtual storage manager to said at least one physical storage device, at least one second command to read said data from said at least one physical storage device;
wherein said plurality of storage schemes includes the ability to perform writes with at least one of (a) mirroring but no striping and (b) both mirroring and striping.

27. The system according to claim 26, further comprising:
in response to a determination that said hardware frame modifier does include said information for converting, converting means for converting said at least one virtual device to at least one physical storage device by said hardware frame modifier device; and
transmitting means for transmitting, from said host's hardware frame modifier to said at least one physical storage device, at least one second command to read said data from said at least one physical storage device.

28. The system according to claim 27, further comprising:
receiving means for receiving within a host's hardware fame modifier device a first command from a host to read data from at least one virtual storage device that was stored utility a data mirroring storage scheme;
generating means for generating a plurality of second commands to read data from each one of a plurality of physical storage devices where a mirrored copy of said data was stored;
receiving means for receiving each of said mirrored copy of said data within said virtual storage manager;
determining means for deter by said virtual storage manager, whether there is an error in any of said each of said mirrored copy of said data; and
in response to a determination by said virtual storage manager that there is no error in any of said each of said mirrored copy of said data, transmitting means for transmitting one copy of said mirrored data to said host.

29. The system according to claim 28, further comprising:
in response to a determination by said virtual storage manager that there is an error in at least one of said each of said mirrored copy of said data, determining means for determining, by said virtual storage manager, whether said error is a recoverable error; and
in response to a determination that said error is a recoverable error, correcting means for correcting said error and transmitting an error-free copy of said mirrored data to said host.

30. The system according to claim 27, further comprising:
receiving means for receiving within a host's hardware frame modifier device a first command from a host to read data from at least one virtual storage device that was stored utilizing a data mirroring storage scheme;
generating means for generating a second command to read said data from one of a plurality of physical storage devices where a mirrored copy of said data was stored;
receiving means for receiving said mirrored copy of said data within said virtual storage manager from said one of said plurality of storage devices;
determining means for determining, by said virtual storage manager, whether there is an error in said mirrored copy of said data; and
in response to a determination by said virtual storage manager that there is no error in said copy of said data, transmitting means for transmitting said mirrored data to said host.

31. The system according to claim 28, further comprising:
in response to a determination by said virtual storage manager that there is an error in said mirrored copy of said data, generating means for generating a third command to read said data from a second one of said plurality of physical storage devices where a second mirrored copy of said data was stored;
receiving means for receiving said second mirrored copy of said data within said virtual storage manager from said second one of said plurality of storage devices;
determining means for determining, by said virtual storage manager, whether there is an error in said second mirrored copy of said data; and
in response to a determination by said virtual storage manager that there is no error in said second mired copy of said data, transmitting means for transmitting said second mirrored data to said host.

32. The system according to claim 28, further comprising:
receiving means for receiving a first command to read data that was stored in a plurality of physical storage devices utilizing a data striping storage scheme;
for each one of said plurality of storage devices, creating means for creating an entry in a striping filter that is associated with each one of said plurality of physical storage devices for converting said command to read only a stripe of said data that was stored in said each one of said plurality of physical storage devices;

determining means for determining, by each said striping filter, a position of said one of said plurality of physical storage devices associated with said each striping filter within said read; and for each one of said plurality of storage devices, transmitting means for transmitting a stripe of data from said one of said plurality of physical storage devices at said one of said plurality of physical storage device's position with said read.

33. A computer program product in a data processing system for managing a storage system that includes a plurality of storage devices, said product comprising:

instruction means or receiving a first command from a host to store data utilizing a first storage scheme of a plurality of storage schemes;

instruction means for determining ones of said plurality of storage devices on which to store the data according to said first storage scheme;

instruction means for generating at least one second command to write data according to said first storage scheme to ones of said plurality of storage devices in response to said receipt of said first command;

instruction means for transmitting said at least one second command to said ones of said plurality of storage devices; and instruction means for storing said data in said ones of said plurality of storage device according to said first storage scheme in response to a receipt of said at least;

wherein said plurality of storage schemes includes the ability to perform writes with at least one of (a) mirroring but no striping and (b) both mirroring and striping.

34. The product according to claim 33, wherein said plurality of storage schemes further includes the ability to perform writes with at least one of (c) striping but no mirroring and (d) neither mirroring nor striping.

35. The product according to claim 33, further comprising:

instruction means for receiving a first command from a host to store data utilizing a data striping storage scheme.

36. The product according to claim 35, further comprising:

instruction means for generating a plurality of second commands;

each one of said plurality of second commands including a different stripe of said data; and instruction means for transmitting each one of said plurality of second commands to at least one of said plurality of storage devices; and storing a different stripe of said data in said at least one of said plurality of storage devices.

37. The product according to claim 33, further comprising:

instruction means for transmitting said at least one second command to a different striping filter associated with each one of said ones of said plurality of storage devices;

said second command included all of said data, who a stripe of said data is to be stored in each one of said ones of said plurality of storage devices, further wherein each said different striping filter received all of said data;

instruction means for filtering all of said data by each said different striping filter to obtain a stripe of said data that is to be stored in one of said plurality of storage devices that is associated with said striping filter; and instruction means for storing said stripe of said data in said one of said plurality of storage devices that is associated with said striping filter.

38. The product according to claim 33, further comprising:

instruction means for receiving said first command within a hardware frame modifier device;

instruction means for determining, by said hardware frame modifier device, whether said first command is a command to store said data in at least one viral storage device;

in response to a determination at said first command is a command to store said data in at least one virtual storage device, instruction means for determining whether said hardware tame modifier device includes information for converting said a least one virtual storage device to at least one physical storage device;

in response to a determination that said hardware frame modifier does not include said information for converting, instruction means for transmitting said first command to a virtual storage manager from said hardware frame modifier device;

instruction means for converting said at least one virtual device to at least one physical storage device by said virtual storage manager;

instruction means for updating, by said virtual storage manager, said hardware frame modifier device to include information for converting said at least one virtual device to at least one physical storage device; and instruction means for transmitting, from said virtual storage manager, said at least one second command to said at least one physical storage device.

39. The product according to claim 38, further comprising:

in response to a determination that said hardware frame modifier does include said information for converting, instruction means for converting said at least one virtual device to of least one physical storage device by said hardware frame modifier device; and instruction means for transmitting, from said hardware fame modifier device, said at least one second command to said at least one physical storage device.

40. The product according to claim 33, further comprising:

instruction means for receiving a first command from a host to store data utilizing a data mirroring storage scheme.

41. The product according to claim 40, further comprising:

instruction means for generating a plurality of second commands, each one of said plurality of second commands including a duplicate copy of said data, each one of said plurality of second commands including a different storage address;

instruction means for transmitting each one of said plurality of second commands to said ones of said plurality of storage devices; and instruction means for storing said duplicate copy of said data in said different storage addresses in said ones of said plurality of storage devices.

42. A computer program product in a data processing system for managing a storage system that includes a plurality of storage devices, said product comprising:

instruction means for receiving within a host's hardware frame modifier device a first command from a host to read data from at least one virtual storage device that was stored utilizing a first storage scheme of a plurality of storage schemes;

instruction means for determining whether said hardware frame modifier device includes information for converting said at least one virtual storage device to at least one physical storage device;

in response to a de ination that said hardware frame modifier does not include said information for converting, instruction means for transmitting said first command to a virtual storage manager from said hardware frame modifier device;

instruction means for converting said at least one virtual device to at least one physical storage device by said virtual storage manager;

instruction means for updating, by said viral storage manager, said hardware frame modifier device to include information for converting said at least one virtual device to at least one physical storage device; and instruction means for transmitting, from said virtual storage manager to said at least one physical storage device, at least one second command to read said data from said at least one physical storage device;

wherein said plurality of storage schemes includes the ability to perform writes with at least one of (a) mirroring but no striping and (b) both mirroring and striping.

43. The product according to claim 42, further comprising:

in response to a detonation that said hardware fame modifier does include said information for converting instruction means for converting said at least one virtual device to at least one physical storage device by said hardware frame modifier device; and instruction means for transmitting, from said host's hardware frame modifier to said at least one physical storage device, at least one second command to read said data from said at least one physical storage device.

44. The product according to claim 43, further comprising:

instruction means for receiving within a host's hardware frame modifier device a first command from a host to read data from at least one virtual storage device that was stored utilizing a data mirroring storage scheme;

instruction means for generating a plurality of second commands to read data from each one of a plurality of physical storage devices where a mirrored copy of said data was stored;

instruction means for receiving each of said mirrored copy of said data within said virtual storage manager;

instruction mews for determining, by said virtual storage manager, whether there is an error in any of said each of said mirrored copy of said data; and in response to a determination by said virtual storage manager that there is no error in any of said each of said mirrored copy of said data, instruction means for transmitting one copy of said data to said host.

45. The product according to claim 44, further comprising:

in response to a determination by said virtual storage manager that there is an error in at least one of said each of said mirrored copy of said data, instruction means for determining by said virtual storage manager, whether said error is a recoverable error; and in response to a determination that said error is a recoverable error, instruction mean for correcting said error and transmitting an error-free copy of said mirrored data to said host.

46. The product according to claim 43, further comprising:

instruction means for receiving within a host's hardware frame modifier device a first command from a host to read data from at least one virtual storage device that was stored utilizing a data mirroring storage scheme;

instruction means for generating a second command to read said data from one of a plenty of physical storage devices where a mirrored copy of said data was stored;

instruction means for receiving said mirrored copy of said data within said virtual storage manager from said one of said plurality of storage devices;

instruction means for determining, by said virtual storage manager, whether there is at error in said mirrored copy of said data; and in response to a determination by said virtual storage manager that the is no error in said mirrored copy of said data, instruction means for transmitting said mirrored data to said host.

47. The product according to claim 44, further comprising:

in response to a determination by said virtual storage manager that there is an error in said mirrored copy of said data, instruction means for generating a third command to read said data from a second one of said plurality of physical storage devices where a second mirrored copy of said data was stored;

instruction means for receiving said second mirrored copy of said data within said virtual storage manager from said second one of said plurality of storage devices;

instruction means for determining, by said virtual storage manager, whether there is an error in said second mirrored copy of said data; and in response to a detention by said virtual storage manager that there is no error in said second mirrored copy of said data, instruction means for transmitting said second mirrored data to said host.

48. The product according to claim 43, further comprising:

instruction means for receiving a first command to read data that was stored in a plurality of physical storage devices utilizing a data striping storage scheme;

for each one of said plurality of storage devices, instruction means for creating an entry in a striping filter that is associated with each one of said plurality of physical storage devices for converting said command to read only a stripe of said data that was stored in said each one of said plurality of physical storage devices;

instruction means for determining, by each said striping filter, a position of said one of said plurality of physical storage devices associated with said each striping filter within said read; and for each one of said plurality of storage devices, instruction means for transmitting a stripe of data from said one of said plurality of physical storage devices at said one of said plurality of physical storage device's position with said read.

* * * * *